3,740,428
VOLATILE INSECTICIDE
Samuel B. Soloway and Juan G. Morales, Modesto, Calif., assignors to Shell Oil Company, New York, N.Y.
No Drawing. Filed Oct. 9, 1970, Ser. No. 79,698
Int. Cl. A01n 9/36
U.S. Cl. 424—219                                3 Claims

ABSTRACT OF THE DISCLOSURE

O-(2,2-dichlorovinyl) O,O-dimethyl phosphorothioate is useful as an insecticide.

BACKGROUND OF THE INVENTION

This invention relates to the use of O-(2,2-dichlorovinyl) O,O-dimethyl phosphorothioate as an insecticide and particularly this invention relates to the use of O-(2,2-dichlorovinyl) O,O-dimethyl phosphorothioate as a vapor phase insecticide in controlling houseflies.

Description of the Prior Art: Dimethyl 2,2-dichlorovinyl phosphate is a known insecticide, see U.S. Pat. 2,956,073 and U.S. Pat. 3,116,201. This compound, commonly known throughout the art as DDVP, is a well-known vapor phase insecticide. The compounds used in the present invention differ from DDVP in that the compounds presently used contain a P→S bond whereas DDVP contains a P→O bond. In this respect, the compound used in the present invention may be hereinafter referred to as "thiono-DDVP." Thiono-DDVP is a novel compound which heretofore has been unobtainable from prior art methods. Thiono-DDVP is claimed in Ser. No. 79,699, filed Oct. 9, 1970.

DESCRIPTION OF THE INVENTION

It has now been found that thiono-DDVP is an excellent insecticide, particularly in the vapor phase. It has a surprisingly low degree of mammalian toxicity as compared with its closest analogs, homologs, and isomers. The activity of O-(2,2-dichlorovinyl) O,O-dimethyl phosphorothioate is shown in the following examples.

EXAMPLE I

Activity against houseflies was tested by counting 100 houseflies into a spray cage. The spray cage was then placed in a spray tunnel and sprayed with 0.6 ml. of test solution. The spray was made at various concentrations using 2–3 replicates for each concentration. After spraying, the flies were anesthetized with $CO_2$, transferred to a recovery cage and placed in a holding room for 18–20 hours after which mortality counts were made. The results were recorded by obtaining the $LC_{50}$, i.e., the concentration at which 50% of the flies were killed. At the same time, similar tests were conducted with respect to Parathion as standard. The results are reported in terms of T.I. (toxicity index), which is the ratio of $LC_{50}$ dosage for Parathion to the $LC_{50}$ dosage for the test compound multiplied by 100. The mammalian toxicity for each of the compounds is also reported in terms of the $LD_{50}$, i.e., the lethal dose in terms of milligrams of test compound per kilogram of body weight required to kill 50% of the mice receiving an oral dosage of the test compounds. The results are recorded in Table I.

TABLE I

| Compound | House Fly toxicity index | $LD_{50}$ (mg./kg.) mice |
|---|---|---|
| $CH_3O$ \ $P(\uparrow S)$—$OCH=CCl_2$ / $CH_3O$ | 36–48 | 933 |
| $CH_3O$ \ $P(\uparrow O)$—$SCH=CCl_2$ / $CH_3O$ | 50 | 83 |
| $CH_3O$ \ $P(\uparrow O)$—$OCH=CCl_2$ / $CH_3O$ | 79 | 162 |
| Parathion | 100 | [1] 6–15 |

[1] Rats.

It is evident from Table I that the compound used in this invention is not only active against insects, but also possesses a surprising degree of safety in the mammal, when compared to closely related analogs and homologs. While the degree of insecticidal activity is not as great as that of Parathion or DDVP, its high tolerance in mammals as indicated by the $LD_{50}$ makes it highly attractive as an insecticide.

EXAMPLE II

Vapor toxicity of DDVP and thiono-DDVP under constant release rate conditions was determined. The vapor was injected at a constant rate into a chamber of measured space having a ventilation rate of 3 air changes per hour. The temperature varied between 22 and 28° C. at the relative humidity of about 60%. Houseflies were exposed to the vapor in ventilated cages and free flying. Vapor concentrations were measured by GLC analysis of air samples. Two types of air chambers were used. The first being a cabinet containing 10 cubic feet of space; the second being a room containing 1,000 cubic feet of space. Some of the cabinet tests were carried out in a chamber containing about 4 sq. feet of normal plaster per 10 cubic feet of volume. The results of these tests are given in Table II.

TABLE II

| Compound | Vapor concentration, mg./l. | $KD_{50}$ houseflies (minutes) | | Input rate, mg./day | Accountability |
|---|---|---|---|---|---|
| | | Ventilated cages | Free flying | | |
| DDVP: | | | | | |
| 10 ft.³ | 0.016 | 100 | 125 | 2.0 | ~15% (normal plaster). |
| 10 ft.³ | 0.072 | 24 | 24 | 2.0 | ~70% (no absorbents). |
| Thiono-DDVP: | | | | | |
| 10 ft.³ | 0.03 | 150 | 185 | 1.5 | ~38% (normal plaster). |
| 10 ft.³ | 0.07 | 72 | 72–78 | 3.5 | Do. |
| 10 ft.³ | 0.11 | | 52–55 | 4.3 | ~48% (normal plaster). |
| DDVP: 1,000 ft.³ | 0.081 | 24 | 26 | 200 | |
| Thiono-DDVP: 1,000 ft.³ | 0.091 | 74 | | 200 | |

The above results show that while thiono-DDVP is not as toxic as DDVP, it is still an effective insecticide. Moreover, the test results show that thiono-DDVP is not as rapidly deactivated by absorption as is DDVP. Plaster is probably the most absorptive material present in domestic homes and from the above tests, which contain what is considered to be a normal area of plaster, the quantity of thiono-DDVP which can be accounted for is much higher than with DDVP, i.e. about 38% for thiono-DDVP as compared to 15% for DDVP.

Based on input therefor, the performance for thiono-DDVP may well be better than that construed from vapor toxicity data only. Since the thiono-DDVP has a much lower mammalian toxicity and also is not absorbed as readily as DDVP, it is a desirable vapor phase insecticide.

EXAMPLE III

The maximum tolerated dosages (MTD) for thiono-DDVP, its diethyl analog O-(2,2-dichlorovinyl) O,O-diethyl phosphorothioate and isomer O-(2,2-dichlorovinyl) O,S-dimethyl phosphorothioate in mice were determined. The results are reported in terms of milligram per kilogram which can be administered to replicates of 5 mice per replicate without causing any deaths. These M.T.D.'s are as follows:

| | M.T.D. Milligrams per kilogram |
|---|---|
| Thiono-DDVP | 250 |
| O-(2,2-dichlorovinyl) O,O-diethyl phosphorothioate | 16 |
| O-(2,2-dichlorovinyl) O,S-dimethyl phosphorothioate | 31 |

From the above, it is obvious that not only is thiono-DDVP distinguishable from DDVP and other thio analogs, but it also possesses considerably less mammalian toxicity than does its diethyl adjacent homolog.

The compound of this invention can be used for controlling insects and formulated as necessary for the purpose, according to conventional practice, such as that set out in detail in U.S. Pat. 3,116,201. For example, the compound can be either sprayed or otherwise applied in the form of a solution or dispersion or can be absorbed on an inert finely-divided solid and applied as a dust. Useful solutions for application by spraying, brushing, dipping and the like, can be prepared by using as a solvent any of the well-known inert horticultural carriers, including neutral hydrocarbons such as kerosene and other light mineral oil distillates of intermediate viscosity and volatility. Adjuvants such as spreading or wetting agents can also be included in the solution. Representative materials of this character are fatty acid soaps, rosin salts, saponins, gelatins, casein, long-chain fatty alcohols, long chain alkyl sulfonates, phenol-ethylene oxide condensates, ammonium salts, and the like. These solutions may be employed as such, or more preferably, they can be dispersed or emulsified in water and the resulting aqueous dispersion or emulsion applied as a spray. Solid carrier materials which can be employed include talc, bentonite, lime, gypsum, and similar inert solid diluents. If desired, the compounds of the present invention can be employed as an aerosol as by dispersing the same into the atmosphere by means of a compressed gas.

Preferably, the compound is formulated in such a manner that volatilization may take place. This can be accomplished by means of any of the known vapor generators in use commercially. For example, the compound can be formulated in a thermoplastic matrix such as those disclosed in U.S. Pat. 3,318,769. Suitable resin matrixes include polyvinyl chlorides, polyvinyl acetals, such as polyvinyl butyral, and block-copolymer-mixtures.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations as little as about 0.01%–.5% based upon the total weight of the composition, even though under some circumstances as little as about 0.001% or as much as about 2% or even more of the compound can be employed with good results from an insecticidal standpoint. Concentrates suitable for sale for dilution in the field and/or for ultra-low volume spray applications may contain as much as 25–50% by weight or even more of the insecticide. If employed in a thermoplastic matrix the concentration of the compound within the matrix can vary from about 5 to 75% of the matrix depending upon the particular thermoplastic involved.

When employed as an insecticide the compound of this invention can be used either as the sole toxic ingredient of the insecticidal composition or can be employed in conjunction with other insecticidally active materials. Representative insecticides of this class include the naturally occurring insecticides such as pyrethrum, rotenone, sabadilla, and the like, as well as the various synthetic insecticides including DDVP, benzene hexachloride, thiodiphenylamine, cyanides, tetraethyl pyrophosphate, diethyl p-nitrophenyl thionophosphate, 1,2-dibromo-2,2-dichloroethyl dimethyl phosphate, azobenzene, and the various compounds of arsenic, lead and/or fluorine.

The compound of this invention can be prepared as described in Ser. No. 79,699, filed Oct. 9, 1970. Basically this method involves treating 2,2-dichlorovinyl phosphorodichloridate with phosphorus pentasulfide to produce the compound O-(2,2-dichlorovinyl) phosphorodichloridothioate. The phosphorodichloridothioate is then reacted with methyl alcohol in the presence of a base or with sodium methoxide to form thiono-DDVP. This method is illustrated more in detail in the following examples.

EXAMPLE IV

O-(2,2-dichlorovinyl) phosphorodichloridothioate

A 411.9 gram (1.79 moles) sample of 2,2-dichlorovinyl phosphorodichloridate was added to 200 grams (0.9 mole) of phosphorus pentasulfide. A nitrogen atmosphere was maintained while the reaction mixture was heated for 5.5 hours in an oil bath at 165° C. The reaction mixture was an homogeneous deep burgundy viscous liquid. Methylene chloride (500 ml.) was then added to the reaction product causing a solid to separate. The solid was filtered to give 94.5 grams of a block powdery crystal containing some light colored amorphous solid dispersed through it. The filtrate was stripped in a rotating evaporator at 50–60° C. and 1.5 millimeters mercury pressure to remove solvent and light ends, which were discarded. The filtrate was then further stripped at 110° C. The light ends obtained from this second stripping amounted to 263.4 grams. This fraction was distilled through a 16" x 0.5" helix packed column with a variable reflux head. Product was collected to a reflux head temperature of from 39–43° C. and 0.02 millimeter mercury pressure and amounted to 123.7 grams of O-(2,2-dichlorovinyl) phosphorodichloridothioate giving a product yield of 29.3%. The composition of the product was determined by a gas liquid chromatography and the structure of the product was confirmed by nuclear magnetic resonance (NMR) and infrared spectrum as well as by chemical analysis for the P→S bond. Elemental analysis for $PSOCl_4C_2H$ was as follows:

Calculated (percent): S, 13.0; P, 12.6; Cl, 57.7. Found (percent): S, 13.0 ; P, 12.6; Cl, 57.8.

EXAMPLE V

O-(2,2-dichlorovinyl) O,O-dimethyl phosphorothioate

A 12.95 gram (0.240 mole) portion of sodium methoxide was suspended in about 70 milliliters of tetrahydrofuran. The mixture was cooled to −5° C. and 30 grams (0.112 mole) of O-(2,2-dichlorovinyl) phosphorodichloridothioate was added. The reaction temperature was maintained at about −5 to 0° C. for two hours and at 32° C. for two more hours. Solvent was removed in a rotating evaporator. The residue was diluted with methylene chloride and a finely divided salt was removed by filtration. The filtrate was stripped in a rotating evaporator at 40° C. at 0.5 millimeter of pressure to leave a residue of 26.4 grams.

This crude residue was further distilled in a falling film molecular still at 61° C. (0.02 millimeter pressure) to yield 11.4 grams of a distillate, 2.0 grams of residue, and 7.3 grams of light ends. The distillate and light ends were combined and redistilled through an 8″ x ⅜″ helix pack column and a variable reflux head to yield 12 grams of product (41.5%). The composition of the product was determined by gas liquid chromatography (GLC) and further identification of the product was made by NMR spectrum as well as by infrared analysis. Elemental analysis was made of the product containing O-(2,2-dichlorovinyl) O,O-dimethylphosphorothioate and a minor amount of the starting material O-(2,2-dichlorovinyl) phosphorodichloridothioate.

We claim as our invention:

1. A method of controlling insects comprising subjecting said insects to an insecticidally effective amount of O-(2,2-dichlorovinyl) O,O-dimethyl phosphorothioate.

2. The method of claim 1 wherein the contacting is carried out in the vapor phase.

3. An insecticidal composition of matter comprising about 0.001 to 75% by weight of the compound O-(2,2-dichlorovinyl) O,O-dimethyl phosphorothioate and an insecticidal adjuvant therefor.

References Cited

UNITED STATES PATENTS 3,264,184   8/1966   Geiger et al. _____ 424—219 X

FOREIGN PATENTS 955,350    4/1964    Great Britain _____ 424—219
1,048,814  11/1966   Great Britain _____ 424—219
1,058,046  11/1959   Germany _____ 424—219

ALBERT T. MEYERS, Primary Examiner

D. W. ROBINSON, Assistant Examiner